EFFECT OF TURBINE INLET
PRESSURE ON TURBINE INLET TEMP.
Fig. 5

EFFECT OF TURBINE INLET
PRESSURE ON TURBINE FLOW
Fig. 6

EFFECT OF INLET
PRESSURE ON TURBINE
SPEED AND POWER FOR
BEST TURBINE
EFFICIENCY
Fig. 7

EFFECT OF TURBINE
SPEED ON TURBINE
POWER OUTPUT AT
BEST TURBINE
EFFICIENCY PRESSURE

United States Patent Office 2,949,541
Patented Aug. 16, 1960

2,949,541
POWER PLANT CONTROL

Albert N. Addie, La Grange Park, Hugh A. Williams, Jr., Downers Grove, and Hugh C. Lafferty, La Grange, Ill., assignors to General Motors Corporation, Detroit, Mich., a corporation of Delaware Filed July 15, 1957, Ser. No. 671,990

19 Claims. (Cl. 290—40)

This invention relates to gas turbines and gasifiers. More particularly it relates to controls for such machines and to controls for free piston gasifiers supplying gases to gas turbines connected to drive a load such as a locomotive electrical generator.

Heretofore, gas turbines supplied by gasifiers such as a free piston engine have been used as power sources. In such installations the power developed by the turbine is ordinarily varied by controlling the fuel supply to the gasifier. It has been found that in any given gasifier-turbine installation that for each condition of gasifier discharge pressure and temperature there is a particular turbine speed at which best turbine efficiency is obtained. Therefore, it would be advantageous if the turbine speed were to be continuously controlled so as to always correspond to the speed of maximum efficiency for each condition of gasifier output. Under certain conditions where the gasifier output is low, such as during idle, such a turbine control would be undesirable, and other methods of power plant control are desirable for efficient operation.

Accordingly, it is an object of this invention to provide a power plant and control system that will operate under maximum efficiency under all conditions of operation.

It is a further object to provide for full manual control of the power output of the turbine with maximum efficiency of operation.

Another object is to provide a control system for a gasifier turbine power plant that will control the speed of the turbine under different gasifier output conditions so as to always operate at maximum efficiency.

A still further object is to provide a gasifier-turbine power plant suitable for use in an electric drive locomotive.

These and other objects and advantages of the invention will be readily apparent from the following specification and drawings which illustrate a preferred embodiment of the invention but which are not to be considered as limiting the invention.

Briefly the invention as exemplified by the preferred embodiment includes a control for a free piston gasifier, supplying gases at high pressures and increased temperatures to a gas turbine connected to drive an electrical generator having a varying electrical load such as locomotive traction motors. The gasifier is controlled during normal low output operation by a manually operated throttle that controls the fuel input and air recirculation within the gasifier. During higher output operation the throttle controls the gasifier fuel feed only. During idle conditions such as exist without the generator electrical load, the speed of a turbine governor is used to control the fuel feed and recirculation. Therefore, during normal operation the engineman has full control of the gasifier output.

For each rate of gasifier output (rate of flow, temperature and pressure) there is one turbine speed at which best turbine efficiency is obtained. This is a shockless gas entry condition. To continuously utilize this best turbine efficiency, there is provided a turbine speed governor which acts to regulate the generator field excitation and thereby vary the turbine load to maintain a given turbine speed. The governor has a variable speed setting that is determined by some function of the gasifier output, in the preferred embodiment the gasifier case air pressure. Thus the control acts to provide proper high efficiency turbine operation under all gasifier and turbine power conditions as varied by the engineman's throttle.

Means are provided in the system for automatically bypassing gas from the gasifier around the turbine in the event the turbine acts to overspeed the given governor setting by more than a predetermined amount. This action is in addition to the normal governor control of the generator load on the turbine and acts to protect the generator and turbine.

Means are also provided to cut out the turbine governor speed control of the load during locomotive wheel slip or during electrical transition as where the locomotive traction motors are changed from series connection to parallel connection. Whenever either of these conditions exist the generator load control is automatically moved to minimum load position.

It will be readily seen to one skilled in the art that the invention may be applied to other installations than in locomotives and can be used whenever a gasifier and turbine are used to drive a load that can be controlled.

Referring to the drawings.

Figure 1:
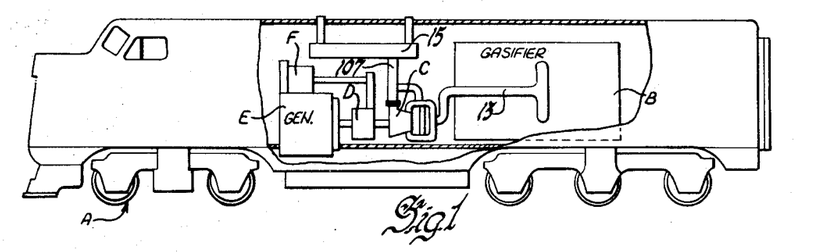
Fig. 1 is a schematic view of a locomotive incorporating the invention.

Referring to the figures which show the preferred embodiment of the invention, Fig. 1 shows a locomotive generally designated by A having therein a Siamese free piston gasifier B which has an output duct 13 that provides gas under increased temperature and pressure to a gas turbine C that drives a generator E through a reduction gear D. The reduction gear D also drives an auxiliary generator F. The generator E furnishes electrical power in known manner to electric traction motors (not shown) that act to drive the locomotive wheels.

Figure 2:
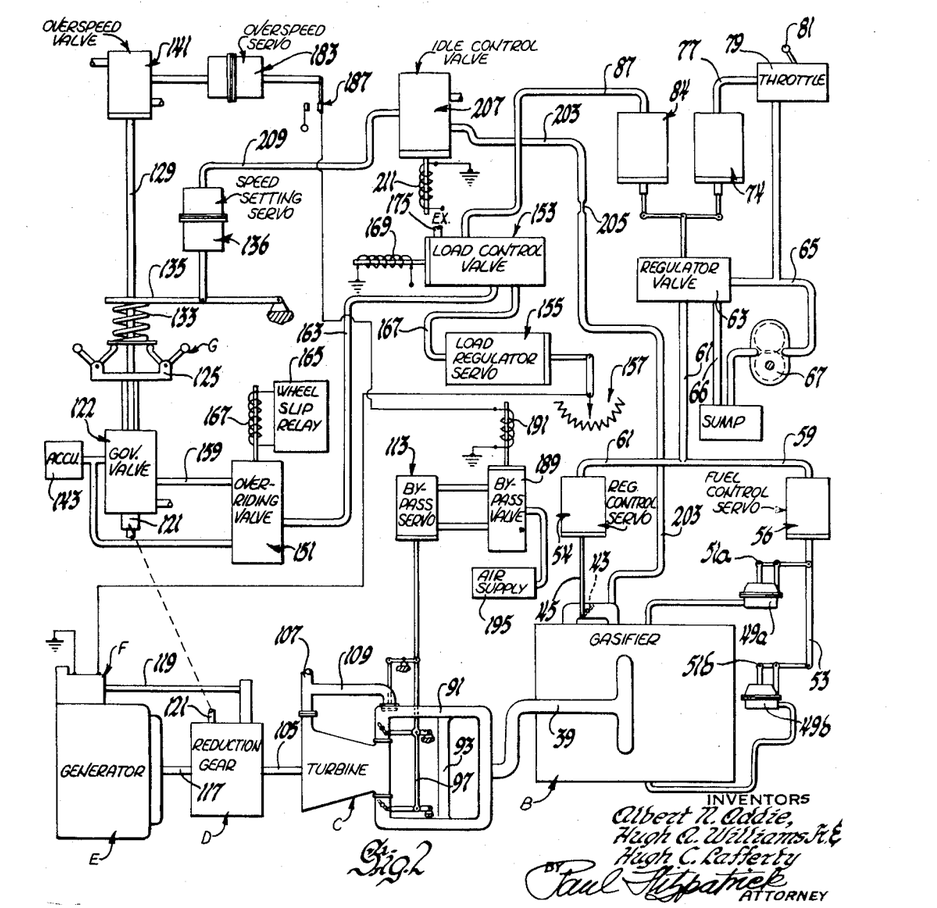
Fig. 2 is a diagrammatic view of the hydraulic, pneumatic and electrical controls for the locomotive power plant.

The control system for the gasifier and turbine is schematically shown in Fig. 2. The turbine and its control is again shown schematically but in greater detail in Fig. 3. The gasifier and its control is again shown schematically but in greater detail in Fig. 4. The gasifier of Fig. 4 may be of any suitable type but in the preferred embodiment is a Siamese free piston gasifier, one unit being on top of the other. The details of the gasifier, which form no part of the invention, have not been shown except diagrammatically to illustrate the use of the invention.

In a free piston type gasifier the temperature, pressure and flow of discharge gases are functions of the fuel input. In the low discharge pressure range, however, the normal gasifier output flow is in excess of what the turbine can utilize; hence, some means must be used to reduce the gasifier flow to meet the turbine requirement. One means utilized in the preferred embodiment reduces the net gasifier output by recirculating part of the output back into the gasifier intake. In the preferred embodiment, as will be more fully explained below, this is done by recirculating hot air from the gasifier air box into the compressor intake shrouds.

Figure 5:
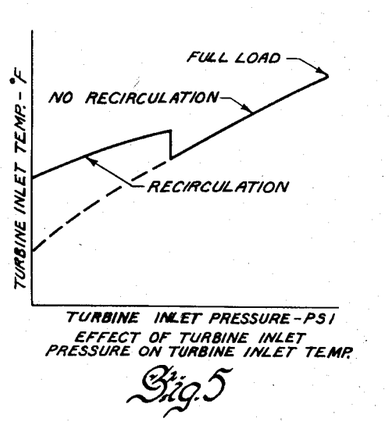
Fig. 5 is a view showing the effect of turbine inlet pressure on turbine inlet temperature.

Fig. 5 shows the approximate relationship of turbine inlet temperature as a function of the turbine inlet pressure in a representative gasifier-turbine arrangement having recirculation control at low pressures. It will be seen that a higher inlet temperature can be maintained in the low pressure range with the recirculation than would be possible without recirculation.

Figure 6:
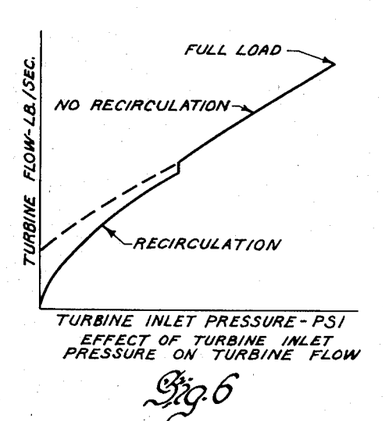
Fig. 6 is a view showing the effect of inlet turbine pressure on turbine flow.

Fig. 6 illustrates the effect, in a typical gasifier-turbine arrangement, of turbine inlet pressure on the turbine flow as measured in pounds per second. Again it can be seen that recirculation at low pressures allows a lower rate of flow to the turbine in the low pressure range than would be possible without the recirculation. Thus with provision for recirculation in the gasifier it is possible to reduce the fuel input to the gasifier, and with the resulting economy of operation, reduce the flow to the turbine and still maintain a sufficiently high temperature and pressure for efficient operation.

Figure 7:
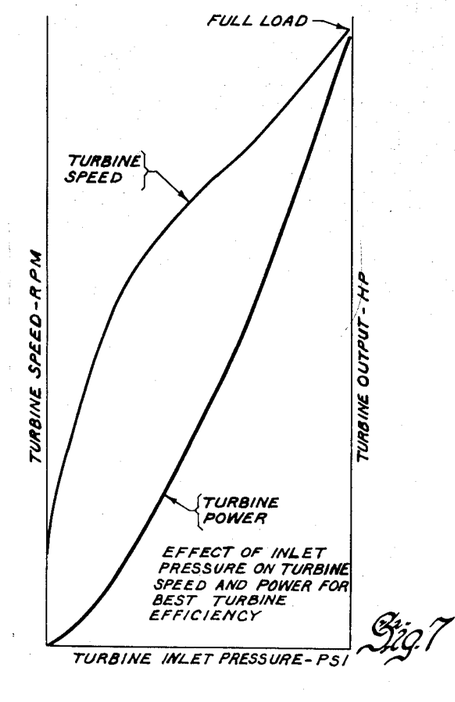
Fig. 7 is a view showing the effect of inlet pressure on turbine speed and power for best turbine efficiency.

In order to obtain the flow characteristics shown in Fig. 6 the engineer's throttle during its initial movement from the closed throttle position is so constructed that it first acts to decrease recirculation from a maximum to zero, thereby increasing the gasifier flow pressure and temperature, and thereafter acts to increase the fuel input per stroke to the gasifier from a minimum to a maximum feed and hence increase the flow, pressure and temperature. Thus, the manually controlled throttle acts initially to control the gasifier output and hence turbine output entirely by controlling the recirculation within the gasifier without directly increasing the fuel supplied to the gasifier. After the recirculation valve is closed, the manually controlled throttle acts directly on the gasifier fuel racks to increase the fuel per stroke and hence increase gasifier output. As stated above, for each condition of gasifier pressure and temperature there is a particular turbine speed at which best turbine efficiency is obtained. This is when the gas impinges on the turbine blading from the turbine nozzles so as to produce shockless entry. Using the relations between the turbine inlet pressure, temperature and flow represented in Figs. 5 and 6, the turbine speed corresponding to each turbine inlet pressure for the condition of shockless entry can be computed, with a result shown in Fig. 7. From Fig. 7 the most efficient turbine speed at any particular turbine inlet pressure can be determined. The turbine power which varies as the turbine speed and pressure is also shown in Fig. 7, that is the most efficient turbine output power for each condition of turbine inlet pressure.

Figure 8:
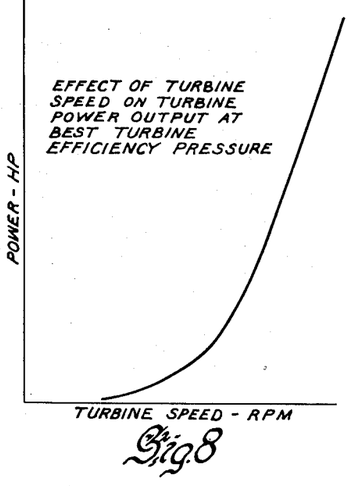
Fig. 8 is a view showing the effect of turbine speed on turbine power output at best turbine efficiency pressure.

Fig. 8 represents the relationship between turbine power and turbine speed for most efficient operation. From the curves shown in Figs. 5 through 8 it can be seen that for each condition of turbine speed or turbine power there is a particular turbine inlet pressure that will give the best turbine efficiency, and contrariwise, for each condition of turbine inlet pressure there is a particular turbine speed and power output that will give the best turbine efficiency.

In a power plant installation, such as in a locomotive, in which it is possible to vary the load on the turbine it is possible to thereby vary the turbine speed. By utilizing a turbine driven governor to control the loading on the turbine to maintain the most efficient turbine speed, and by varying the setting of the turbine governor in accordance with changes in turbine inlet pressure, it is possible to always operate the turbine at its most efficient conditions. It has been found that the air box pressure, that is the pressure of compressed air in the gasifier prior to its passing through the combustion stage of the gasifier, varies almost directly with the gasifier output pressure. It is therefore possible to use the air box pressure as a means to control the speed setting of the turbine governor for most efficient turbine operation. This has some advantages in that the air box gases are at a lower temperature and are not contaminated by combustion products. Actual gasifier output or turbine inlet pressure could be utilized for controlling the speed setting of the governor, however in the preferred embodiment air box pressure is used.

*Gasifier*

Figure 4:
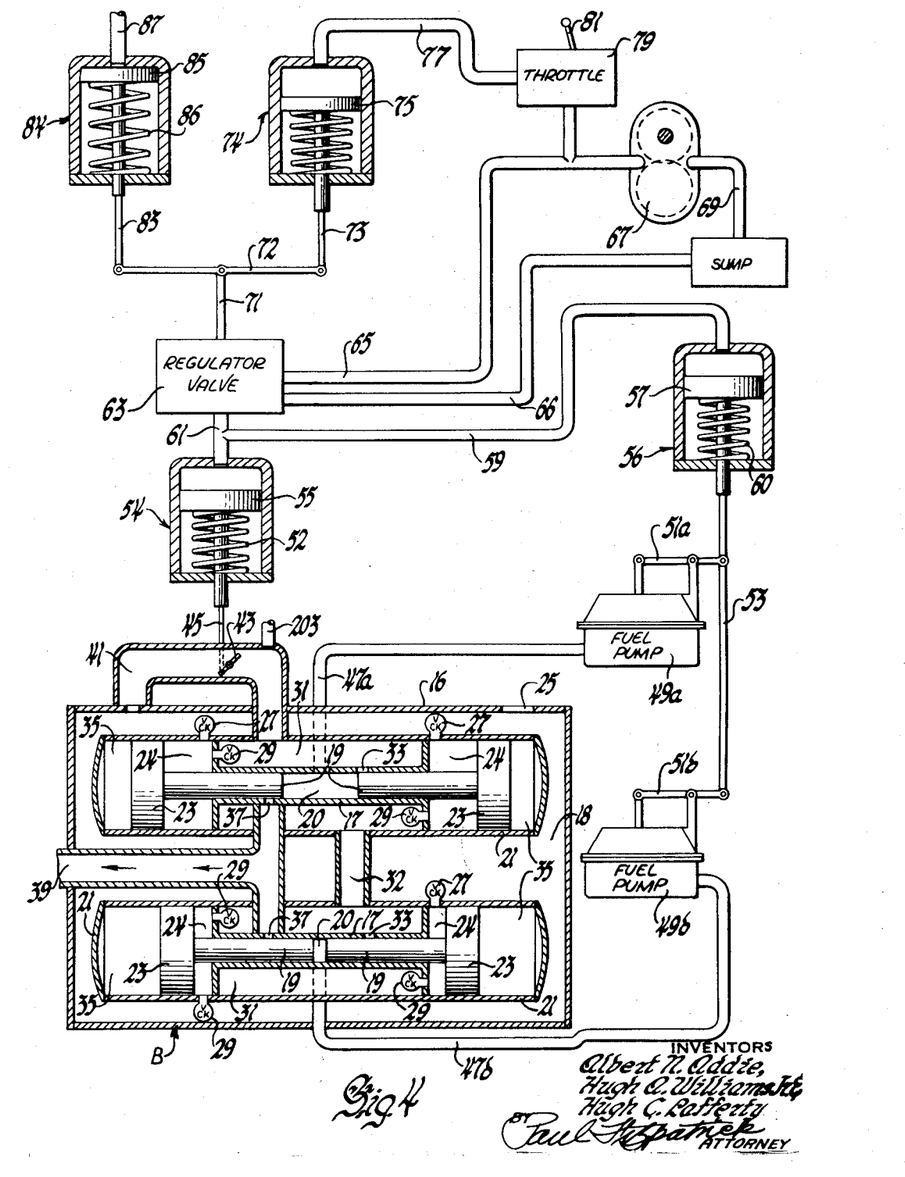
Fig. 4 is an enlarged schematic view of the gasifier control.

The free piston gasifier includes a case 16 that forms an air supply shroud for two free piston power units arranged one above the other. Each power unit has a motor cylinder 17 having therein a pair of motor pistons 19 that form therebetween a combustion chamber 20. Each unit has an annular member 21 forming on opposite ends a pair of compressor cylinders each having therein a compressor piston 23. The pistons 23 are each connected to one of the motor pistons 19. The space between the outer case 16 and the compressor cylinder member 21 acts as an air collecting chamber 18 that normally receives air through one or more inlet ports 25, only one of which is shown. Provided in each of the compressor cylinders 21 are one or more inlet valves 27 that act to admit air into the compression chamber 24 from the air supply chamber 18 when the compressor pistons 23 are moving outward. Compressor exhaust valves 29 located between the compressor chambers 24 and the air box chamber 31 allow air compressed in the compressor chambers 24 by the pistons 23 to be discharged into the air box chamber 31 formed within the cylinder 21. The upper and lower air box chambers 31 are connected by a conduit 32 to equalize the pressure therein and to minimize pulsations. Each of the motor cylinders 17 has one or more intake ports 33 that are controlled by the motor pistons 19 to admit air under pressure from the air box chamber 31 into the combustion chamber 21, such air acting to scavenge the combustion products from the chamber 20 through exhaust ports 37 into a common exhaust duct 39. The volume of air from the air box 31 passing into chamber 20 is considerably in excess of that needed for scavenging alone and provides the major portion of compressed gases needed to drive the gas turbine. The remainder of the gases are made up of combustion products. The air passing from the air box 31 into the combustion chambers 20 also acts to supply oxygen for burning the fuel in the combustion chamber 20 after compression of a fixed quantity of air in the chamber 20 by the motor pistons 19.

One or both of the free piston units are provided with a recirculation passage 41 that connects the air box chamber 31 with the air collecting chamber 18. In each recirculation passage is a valve 43 shown of the butterfly type, although other types of valves may be used. The valve 43 is moved by a linkage 45 between a position fully closing the recirculation passage to a position fully opening the recirculation passage. The upper and lower free piston units have fuel supply passages 47a and 47b, respectively, that receive fuel from pumps 49a and 49b, respectively, controlled by linkages 51a and 51b, respectively. The fuel supply passages 47a and 47b supply fuel to injectors of the diesel type, not shown, that inject fuel into the combustion chambers 20. The fuel pump linkages 51a and 51b are controlled by a common linkage 53 in turn controlled by mechanism later described.

Gasifier controls

Figure 9:
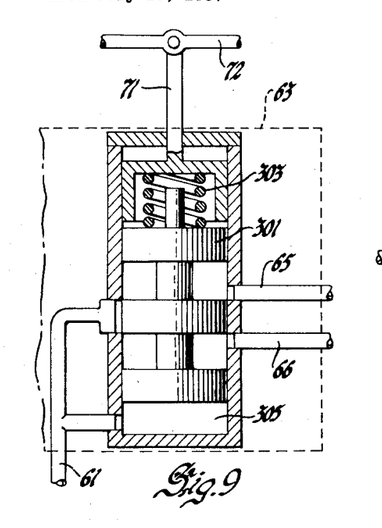
Fig. 9 is an enlarged schematic view of the pressure regulator valve.

The controls for the gasifier include a recirculation valve control servo generally designated 54 having a piston 55 responsive to pressure in servo 54 to move against a spring 52 and close the butterfly valve 43 thereby blocking the recirculation passage 41. The fuel pumps 49a and 49b, which are of known type, are controlled by a hydraulic servo generally designated at 56 having a pressure responsive piston 57 that moves against a spring 60 to increase the quantity of fuel injected into the combustion chambers 20. Spring 52 is lighter than spring 60 so that an increase in pressure in line 61 will act on piston 55 to close the recirculating valve 43 before piston 57 is moved to increase the fuel supply to the gasifier. The fuel pump servo 56 is connected by a supply passage 59 to a passage 61 leading from a regulator valve 63. The passage 61 also acts as a supply for fluid under pressure that acts on the recirculation valve servo 54. The regulator valve 63, the details of which form no part of the invention, may be of any known type that furnishes an output pressure in accordance with varying force that acts on the valve. The pressure regulator valve generally indicated 63 is shown as a conventional pressure regulating valve member 301 that is urged downward, as seen in the figure, by the force of a spring 303 which is compressed by the plunger 71. The valve member 301 is moved between the centered position shown and a position allowing oil under pressure from pump pressure line 65 to pass to the fuel pump control passage 61. Pressure in line 61 acts in chamber 305 to oppose the force of spring 303 to move the valve back to its centered position. If the plunger 71 is moved up by the link 72, the spring force is decreased and pressure in chamber 305 will move the valve member 301 to allow excess pressure in line 61 to exhaust to the sump through passage 66. The valve assembly 63, therefore, regulates the pressure in passage 61 in accordance with the position of plunger 71. The regulator valve 63 is supplied with fluid under constant pressure from a supply line 65 which is connected to the output of a positive displacement pump 67 driven by any suitable means. The inlet of pump 67 is connected by a suction line 69 to an oil sump. Return line 66 serves to return excess oil from valve 63 to the sump.

Figure 10:
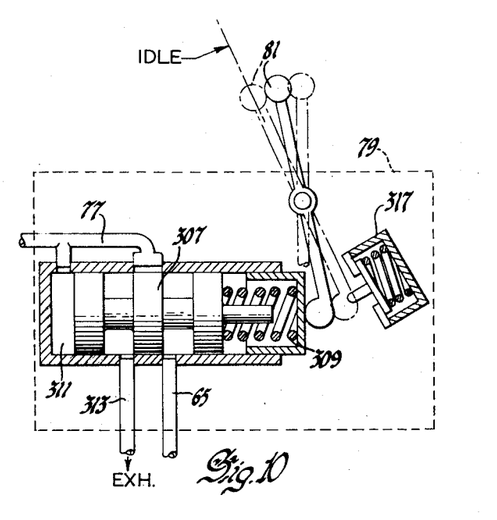
Fig. 10 is an enlarged schematic view of the throttle control.

The mechanism which acts to create the varying force on the regulator valve 63 to produce the modulated pressure in line 61 includes a plunger 71 connected to a link 72 having on one end a plunger 73 controlled by a throttle servo generally designated at 74. The throttle servo 74 includes a piston 75 that is responsive to a modulated pressure from line 77 connected to a throttle control valve assembly 79. The throttle control valve 79, the details of which forms no part of the invention and may be of any suitable form, receives fluid under constant pressure from the pump 67 and furnishes an output pressure to line 77 that varies with the position of the manual control lever 81. Figure 10 shows a form of throttle valve that might be used. A spool valve member 307 similar to the pressure regulator valve member 301 is urged in one direction by the force of spring 309, which force is varied by the position of throttle lever 81. The valve moves between the equilibrium position shown and a position allowing pump pressure from line 65 to pass into the throttle pressure conduit 77. Pressure in that conduit 77 acts in chamber 311 to move the valve member 307 against spring 309 to its centered position and if the force on the valve due to the pressure in chamber 311 exceeds the force of spring 309, the valve member 307 will connect passage 77 to an exhaust port 313 and relieve pressure until the pressure in chamber 311 is such that the forces acting on valve member 307 are equal. The control lever 81 is commonly called the engineman's throttle. By moving the lever 81 the engineman can vary the pressure in line 77 to vary the position of piston 75 and through linkage 73, 72 vary the position of plunger 71 and through the action of regulator valve 63 thereby control the pressure in passage 61. The other end of lever 72 has a plunger 83 connected thereto whose position is controlled by a servo generally designated at 84 and which includes a piston 85 responsive to fluid under pressure in line 87. The function and operation of servo 84 will be discussed in detail below.

Turbine and controls

Figure 3:
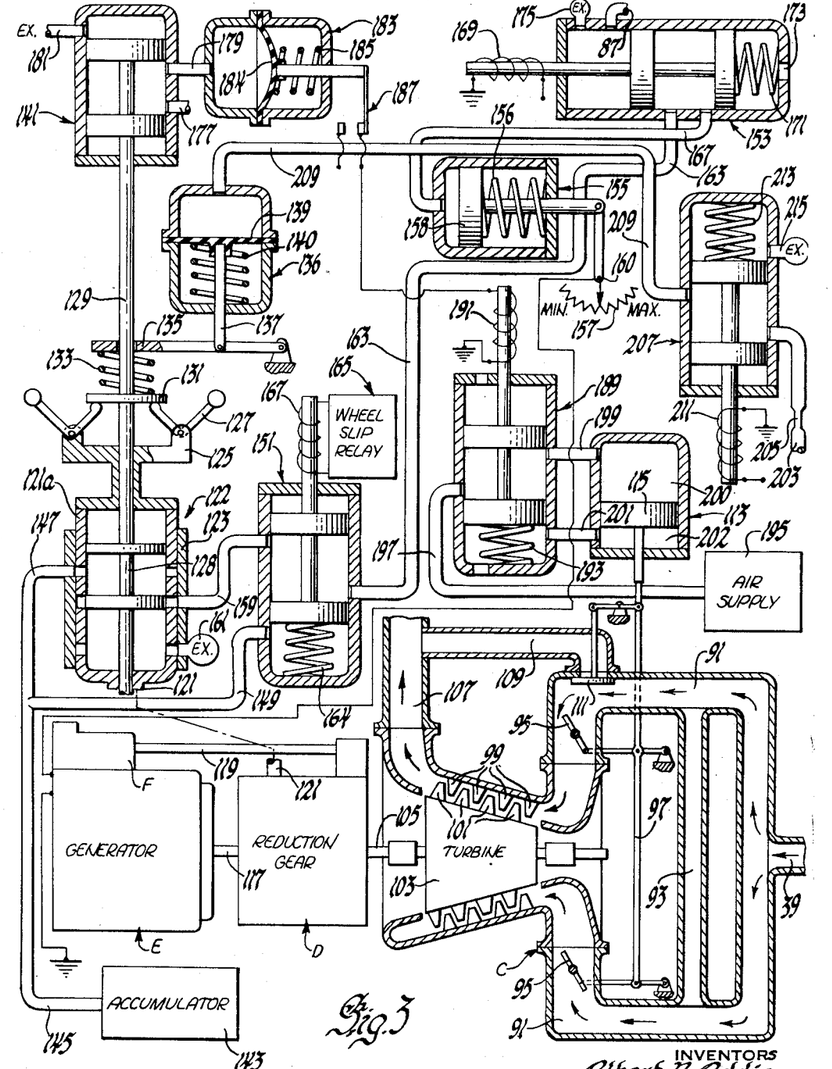
Fig. 3 is an enlarged schematic view of the turbine and generator control.

Fig. 3 shows schematically the turbine C and its related controls. The turbine C, which may be of any known type but which in the preferred embodiment is of the axial flow type, receives gas under pressure from the gasifier exhaust duct 39. The gas from duct 39 is carried through upper and lower inlet ducts 91 connected by a cross duct 93. The gas inlet ducts 91 have therein blockage valves 95, which may be of any suitable type, but which are shown as butterfly valves. The blockage valves 95 are controlled by a common operating link 97. The turbine itself consists of a plurality of reaction stages identified by the vanes 99 interposed in front of each of a plurality of turbine stages identified by the buckets 101 commonly connected to drive a rotor 103 carried on a turbine shaft 105. The gases after having passed through the turbine elements pass into an exhaust passage 107 that is connected to a collecting chamber and silencer 15 to be exhausted out the top of the locomotive (Fig. 1).

The turbine has a by-pass conduit 109 connecting the inlet duct 91 with the exhaust duct 107. The by-pass duct 109 is controlled by a valve 111, of any suitable form. The valve 111 is controlled by the same linkage 97 that controls the blockage valves 95 and is operated by a by-pass control servo generally designated 113 that has a pressure responsive piston 115 that acts to move the blocking valves 95 and by-pass valve 111 to their various operative positions.

The turbine output shaft 105 drives through the reduction gear D, which may be of any known type, and has any suitable speed reduction. An output shaft 117 is connected to drive the main generator E, an auxiliary output shaft 119 is connected to drive a D.C. exciting generator F that furnishes current for the main generator field.

The reduction gear D has an additional shaft 121 that drives a turbine governor generally designated as 122 described below.

Turbine governor

The turbine governor which acts as the main control for the turbine and at certain times as the control for the gasifier may be of any suitable type and is shown schematically in Fig. 3. The governor includes a rotatable valve body 121a connected to the governor drive shaft 121. The valve body 121a is rotatably mounted in a stationary bushing 123 and has formed on its upper end a ball head 125 having pivoted centrifugal flyweights 127. Located in the valve body 121a is a spool valve member 128 having an operating plunger 129 that is moved by a flange 131 whose position is determined by a spring 133 and the flyweights 127. The spring 133 which bears on its lower end against the plunger flange 131 reacts on its upper end against a speed setting member 135. The position and force of the speed setting member 135 is controlled by a speed setting servo designated at 136 that includes a plunger 137 connected to a diaphragm 139 on which acts air box pressure from conduit 209. It will be seen that the position of the valve 128 is dependent on the relative forces between the centrifugal flyweights 127 and the force of spring 133 as varied by the speed setting diaphragm 139.

At the upper end of governor valve plunger 129 is an overspeed control valve assembly designated 141 whose operation and function is described below. Governor valve 122 is supplied with oil under pressure from a suitable source, such as an accumulator 143, but which may be a governor driven pump, a combination of pump and accumulator, or other source. Governor supply passage 145 connects via a passage 147 into the governor valve body 121a. A branch passage 149 leading from the governor supply conduit 145 leads to an overriding valve assembly designated 151 described below.

Idle control valve

Idle control valve 207 is normally held in the position shown in Fig. 3 by normally energized solenoid 211, to connect passage 203 leading from the gasifier air box 31 with passage 209 leading to the speed setting servo 136. When throttle lever 81 is in idle position solenoid 211 is deenergized allowing spring 213 to cut off line 203 from line 209 and connect 209 to exhaust port 215. A restriction 205 acts to prevent momentary pressure changes in air box 31 from affecting speed setting servo 136.

Load regulator control

The speed of turbine C is controlled so that the turbine operates at its highest efficiency for each condition of gasifier output, the speed being varied by changing the turbine load. The main turbine load is the main generator E and by varying its field excitation the turbine load can be controlled. The load regulator control consists of a pilot valve designated 153 that allows oil from governor 122 to flow to a load regulator servo 155 which controls the position of a variable rheostat 157 interposed in the main generator field circuit. The generator field circuit could also include a battery set in parallel with the excitation generator in a conventional manner such as that shown and described in the patent to L. L. Johnson et al. No. 2,745,050, entitled "Locomotive Dynamic Braking System." The valve body 121a also has ports leading to the governor outlet passage 159 and an exhaust passage 161 connected to a sump (not shown). In the normal equilibrium position shown in Fig. 3, valve 128 closes passage 159 so to disconnect it from both the governor supply passage 147 and the exhaust passage 161. The governor outlet passage 159 connects through the overriding valve assembly 151, whose normal position is shown in Fig. 3, to conduit 163 leading to load control pilot valve 153. Oil in conduit 163 then flows through the valve 153, normally in the position shown in Fig. 3, to a load regulator servo line 167, then to the load regulator servo 155. The governor valve 128 acts to trap a quantity of oil in lines 159, valve 151, line 163, valve 153, line 167 and servo 155 to hold the load regulator in a fixed position. If the turbine and reduction gear speed increases, as in the case of a decrease in the load on the generator E, flyweights 127 move outward and tend to move governor plunger 129 and valve 128 upward. This allows oil trapped in the load regulator servo system to be forced out the exhaust passage 161 by the load regulator servo spring 156 pushing on load regulator servo piston 158. Movement of the load regulator piston 158 to the left, as viewed in Fig. 3, moves the load regulator rheostat movable arm 160 to the right or maximum field position. This increases the main generator field excitation and thereby increases the turbine load to slow it down until the force of the flyweights 127 is reduced to allow spring 133 to move plunger 129 and valve 128 back to the equilibrium position of Fig. 3.

If the turbine should slow down, as where the load on the generator E increases, flyweights 127 tend to move inwardly allowing spring 133 to move the valve 128 downward thereby allowing governor supply oil from passage 147 to flow to the load regulator feed conduit 159. Oil will continue to flow into passage 159 through valve 151, conduit 163, valve 153, conduit 167 and move piston 158 against spring 156 moving the rheostat movable arm 160 to the left or minimum load position. This decreases the main generator field current which reduces the turbine load allowing it to speed up until the flyweights 127 act to move the valve 128 into its equilibrium position wherein the volume of oil in the load regulator servo system remains constant. This governor control of the load regulator can take place continuously and acts to maintain the turbine speed at a predetermined constant value determined by the force exerted on governor spring 133 by the speed setting member 135.

Overriding valve

The overriding valve 151 is controlled by a spring 164 and a relay 165 that energizes a solenoid 167. The relay 165 is actuated by any known type of control, not shown, that functions whenever there is wheel slip, that is whenever the wheels driven by one of the traction motors is rotating at a speed different than the wheels driven by other traction motors. Ordinarily if one of the traction wheels slips, the load on the traction motor and, hence, generator would decrease allowing the turbine speed to increase causing the governor to move valve 128 to allow oil in the load regulator servo system to exhaust resulting in the load regulator rheostat 157 being moved to the maximum field position to put a greater load on the generator E. This would be undesirable as a wheel slip condition is an indication that there is probably too high a loading of the traction wheels. With the solenoid 167 energized by the relay 165 during the wheel slip condition, the overriding valve 151 is moved downward against spring 164 to disconnect feed passage 159 from the load regulator servo system and directly connect the governor supply branch 149 to conduit 163. Oil from the accumulator 143 then passes through conduits 145, 149, 163, valve 153 and conduit 167 to move load regulator piston 159 to a minimum field position. This reduces the power output of the generator E and corrects the wheel slip condition. When the wheel slip has ceased relay 165 will deenergize the solenoid 167 allowing the overriding valve 151 to return to its normal position of Fig. 3. The relay 165 can also be used to cut out the governor control of the load regulation during electrical transition, that is during the time when the electrical power system in the locomotive is changed from series to shunt operation or vice versa.

Load regulator pilot valve

The pilot valve 153, through which the governor oil passes to control the load regulator servo 155 and which is normally positioned as shown in Fig. 3, is positioned by a solenoid 169, normally energized, and by a spring 171. During idle conditions, that is when the engineman's throttle lever 81 is placed in idle position the solenoid 169 is de-energized allowing spring 171 to move the valve 153 to the left. In this position oil in the servo 155 passes to exhaust through line 167 and exhaust port 173 formed in the pilot valve assembly 153. This allows spring 156 to move rheostat 157 to the maximum load position. When the pilot valve 153 is in its left hand or idle position the governor oil line 163 is connected to a passage 87 which leads to a governor fuel and recirculation control servo 74 (Fig. 4). When the valve 153 is in its right hand or normal position passage 87 is connected to exhaust passage 175 that leads to the oil sump. Thus, when the engineer's throttle lever 81 is in its idle position, resulting in the pilot valve 153 being in its left hand position, the oil in line 163 controlled by the turbine governor 122 acts to move the servo 84 and control the position of piston 85 instead of the load regulator piston 58. The piston 85 is moved by the governor oil against the spring 86 to position the plunger 83 and plunger 71 to control the regulator valve 63. As explained above, the regulator valve 63 produces a pressure that varies with the position of plunger 71 and acts to control the recirculation servo 54 and the fuel pump control servo 56. During idle condition there is no load on the main generator E, but because the turbine is required to drive any number of auxiliary generators, compressors, blowers, etc. having varying loads it is necessary to control the gasifier B to maintain a constant turbine speed. With the turbine governor 122 controlling the servo 84 and, hence, the pressure from regulator valve 63 that acts on the recirculation servo 64 and fuel pump control servo 56, the turbine speed acts to directly control the gasifier output by opening and closing the recirculation valve 43 to by-pass air from the air box 31 back to the air supply chamber 18. This results in the reduction of gasifier output flow to the turbine with a corresponding decrease in gasifier speed and fuel input, thereby promoting low idle fuel consumption.

*Overspeed and turbine by-pass*

Under the wheel slip or electric transition conditions described above the load is removed from the turbine, that is the field excitation rheostat 157 is moved to minimum load position. Such load removal would normally act to cause serious overspeeding of the turbine and generator. To prevent overspeed there is provided an overspeed control valve 141 (Fig. 3) positioned by the governor plunger 129. A pressure supply passage 177 and an exhaust passage 181 are alternatively connected to an overspeed switch servo supply passage 179.

An overspeed servo 183 includes a diaphragm 184 urged by a spring 185 to close a switch 187 to energize a solenoid 191 to control a double acting turbine by-pass control valve 189. The valve 189 is normally held in the position shown in Fig. 3 by a spring 193 that urges valve 189 against a stop, not shown. In this position air under pressure from a suitable reservoir or supply 195 flows from passage 197 between the lands of valve 189, through passage 199 into the chamber 200 to act on the turbine by-pass control servo piston 115 to move link 97 downward as viewed in Fig. 3. Link 97 in this position acts to close the by-pass valves 111 and open the blockage valves 95.

If during wheel slip, transition or other conditions the turbine speed increases more than a predetermined amount, say for example 5%, over the value called for by the speed setting element 135, as would be the case where the turbine load is removed by the load regulator 157 moving to minimum position, the overspeed valve 141 will be moved by the governor to connect the passage 179 with the exhaust port 181 allowing spring 185 to move diaphragm 184 and close switch 187. This acts to energize solenoid 191 which acts to move the turbine by-pass servo control valve 189 down against the spring 193 to connect the air supply passage 197 with passage 201 leading to chamber 202 below piston 115 forcing it and link 97 upward. Air in chamber 200 is allowed to escape through passage 199 out the exhaust port in the top of valve 189. Movement of link 97 upward, as viewed in Fig. 3, acts to close blockage valves 95 and open the by-pass valves 111. This acts to duct exhaust gas flow from the gasifier to atmosphere through by-pass conduit 109 and the turbine speed is thus reduced because of the reduced gas flow through the turbine.

Upon the turbine slowing down to a speed below the critical overspeed value, for example 5%, above the speed setting of element 135, overspeed valve 141 will again connect the pressure passage 177 to the switch servo 183 opening switch 187 and de-energizing solenoid 191 to allow spring 193 to return the by-pass control valve 189 to its normal upper position. The blockage valves 95 are then again open and the by-pass valves 111 closed, allowing the gasifier exhaust gases from conduit 39 to pass through the turbine.

Figure 11:
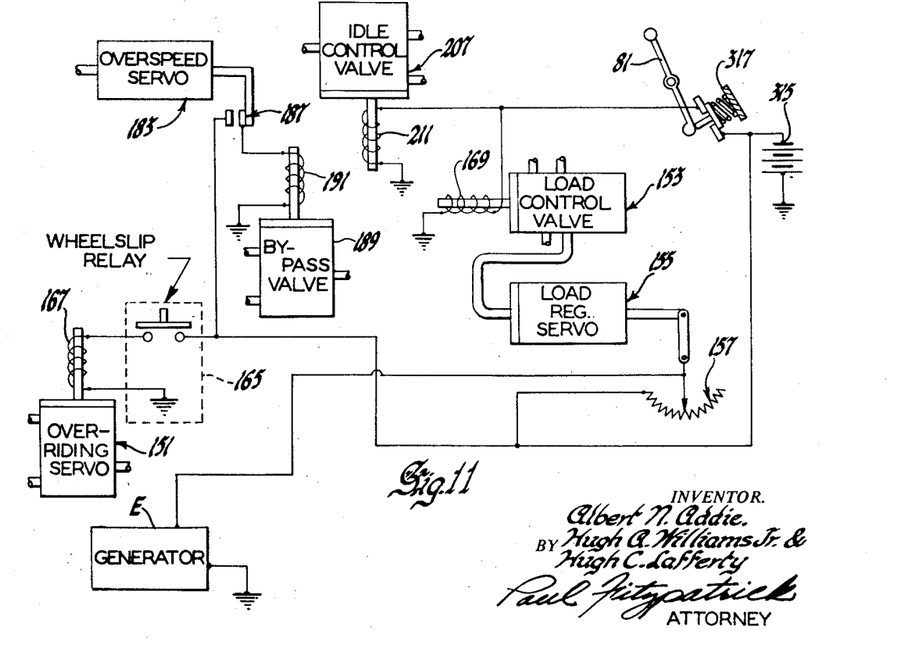
Fig. 11 is a schematic wiring diagram of the control system.

The connections between the various electrical elements of the gasifier and turbine controls are schematically shown in Fig. 11. As seen in Fig. 11 and in Fig. 10, a switch 317 is opened when the throttle lever 81 is in idle position. Opening of switch 317 breaks the connection between battery 315 and both the solenoid 211 and solenoid 169 controlling the idle control valve 207 and load control valve 153 respectively. The effect of this operation is described in detail below as part of the operation description.

*Operation*

A description of the operation of the power plant will now be made. The gasifier or free piston unit is started by the operator, which in the case of a locomotive installation is the engineer, by any suitable means, not shown. With the manual throttle lever 81 in its closed or idle position the pressure from the throttle regulator valve 79 is at a minimum whereby the piston 75, links 73, 72 and 71 act on the regulator valve 63 to regulate a minimum pressure in line 61 that acts on piston 55. This allows spring 52 to move piston 55 and link 45 to open the recirculation valve 43 and allow a considerable portion of the gases in the air box chamber 31 to return to the air intake chamber 18. Thus, the flow out of the gasifier through conduit 39 to the turbine inlet conduits 91 is at a minimum, but still sufficient to operate the turbine C and the unloaded generator E connected thereto. With the throttle lever 81 in closed or idle position, the idle speed control valve solenoid 211 is de-energized whereby the valve 207 acts to cut off the connection between passage 203, leading to the gasifier air box, and the passage 209 leading to the governor speed setting servo 136. Under these conditions changes in gasifier air box pressure will have no effect on the turbine governor. With the throttle in idle position the load regulator pilot valve solenoid 169 is de-energized allowing spring 171 to position the pilot valve 153 to connect the governor pressure line 163 with the regulator valve turbine speed passage 87 leading to the regulator valve turbine speed control 84. Under these conditions changes in the turbine speed, which are reflected by the flow of governor oil into or out of passage 159, will cause piston 85 of the regulator valve turbine speed control servo 84 to vary the setting of the regulator valve 63 to regulate the pressure from line 65 to the conduit 61 and vary the position of piston 55 of the recirculation valve servo 54 to open and close the recirculation valve 43 and thereby vary the gasifier flow output in accordance with changes in turbine speed. When the generator E is unloaded, as would be the case with the locomotive standing still and the throttle 81 in idle position, there may be a varying load on the turbine C due to accessories, such as compressors, generators, blowers, etc., turning off and on. If these accessories act to increase the load on the turbine C they will tend to slow it down causing the governor G to control the servo 84 to increase the regulator valve pressure in line 61 and thereby move the recirculating valve towards closed position causing an increased gas flow from the gasifier B to the turbine C to increase the speed of the turbine until the givernor G is again in its equilibrium position. If the accessory load on the turbine C is reduced, the governor G through the medium of the servo 84 will reduce the pressure in line 61 to allow spring 52 to open the recirculating valve 43, thereby cutting down the flow from the gasifier to the turbine and causing the speed to decrease to a predetermined equilibrium speed. This idle equilibrium speed is determined by the force of governor spring 133 when there is no pressure acting on the speed setting diaphragm 139, as is the case when the power plant is in idle condition.

To start the locomotive moving the engineman moves the throttle 81 out of its idle position thereby increasing the pressure in line 77 that acts on the regulator vave throttle servo 74 which acts through links 73, 72 and 71 to cause the regulator valve 63 to increase the pressure in line 61 that acts on the recirculating valve servo 54 and the fuel pump control servo 56. The spring 52 of the recirculating valve servo is calibrated relative to the spring 60 of the fuel pump control servo 56 so that the fuel supply servo 56 does not move linkages 53, 51a and 51b to increase the output of fuel pump of outputs 49a and 49b to the gasifier until the recirculating valve 43 has been fully closed by the recirculating valve servo 54. Thus, during initial movement of the throttle control lever 81 from its idle position the gasifier output flow is increased by closing the recirculating valve 43. After the recirculating valve 43 has been fully closed, further movement of the throttle control lever 81 acts to increase fuel supplied by the fuel pumps 49a and 49b and thereby increase the gasifier output and pressure. When the throttle control lever 81 is moved out of idle position, the idle speed control valve solenoid 211 is energized to move the valve 207 to again connect the air box compressor line 203 with the speed setting servo 136 via passage 209. Thereafter any changes in the gasifier air box pressure will act on the speed diaphragm 139 to vary the loading of spring 133 and thereby vary the equilibrium speed of the governor G. An increase in gasifier pressure will cause an increase in the loading of spring 133 and require a greater centrifugal force, and hence speed of the flyweights 127, to hold the governor valve 128 in its equilibrium position. The spring 133 and the speed setting diaphragm spring 140, the area of diaphragm 139 acted on by air box pressure as well as the mass and geometrical proportions of the flyweights 127, are so designed that the equilibrium turbine speed setting will change with the air box pressure in accordance with the maximum turbine efficiency curve shown in Fig. 7. When the throttle control lever 81 is moved out of its idle position the load regulator control valve solenoid 169 is energized to move the valve 153 to the position shown in Fig. 3. The valve 153 is then positioned to cut off communication between the governor line 163 and the regulator valve servo 84 and to establish communication between the governor line 163 and the load regulator servo 155. Thereafter as the turbine speed varies from the speed called for by the position of speed setting element 135, as determined by the gasifier air box pressure, the governor G will regulate the flow of oil into and out of passage 159 through the overriding valve 151, governor line 163, load control pilot valve 153 and into and out of the load regulator servo 155 to move the rheostat control 160 to either increase or decrease the generator field excitation and thereby increase or decrease the generator load on the turbine C until the turbineC has again reached the equbrium speed called for by the air box pressure acting on the speed setting diaphragm 139.

During acceleration of the locomotive the engineer may wish to change the electrical connections between the traction motors and the generator which will result in the generator load being cut out and, hence, the load on the turbine is greatly reduced. During this transition a relay, which may be the wheel slip relay 165, is caused to energize the solenoid 167 to move the overriding valve 151 down as viewed in Fig. 3 to disconnect the governor G from connection with the load regulator servo 155 and directly connect the governor supply lines 145 and 149 to the load regulator servo 155. This will allow sufficient oil from the governor accumulator 143 to pass through the system to move the load regulator servo 155 and the load regulator rheostat 160 to the minimum load position. This action of cutting out the governor control during the electrical transition prevents the load regulator from being moved to an increased load position which would be undesirable during electrical transition. With the load removed from the turbine C the turbine will speed up until the overspeed control valve 141 is moved by the governor from its normal position shown on Fig. 3 to a position whereby fluid under pressure acting on the overspeed switch diaphragm 184 is allowed to escape through exhaust port 181 thereby allowing spring 185 to close the overspeed switch 187. Closing switch 187 causes energization of the turbine by-pass control valve solenoid 191 which moves the turbine by-pass control valve 189 from the position shown in Fig. 3 downward to a position wherein the air supply conduit 197 is connected to passage 201 to act in chamber 202 on the by-pass control piston 115 to move the blockage valves 95 toward their closed position and simultaneously open the by-pass valves 111. This causes the by-passing of gasifier output gases around the turbine C and thereby the reduction of power input to the turbine C. Upon completion of the electrical transition, the solenoid 167 is de-energized and the overriding valve 151 returns to its normal position to again connect the governor G with the load regulator servo 155 to vary the generator load on the turbine and act to maintain a speed determined by the gasifier air box pressure that acts on the speed setting diaphragm 139. With the electrical load again on the generator E, the turbine will slow down below the point at which the overspeed control valve 141 will act to close the by-pass control switch 187. This will allow the turbine by-pass control valve 189 to again cause the by-pass piston 115 to be moved to its position shown in Fig. 3, whereby the blockage valves 95 are opened and the by-pass valves 111 are closed.

Wheel slip, which may be measured by any suitable means, not shown, will activate the wheel slip relay 165 in the same manner as an electrical transition described above, that is, the load will be removed from the generator and turbine until the wheel slip condition has been corrected. Overspeeding of the turbine during this condition will be prevented from the overspeed valve acting to control the by-pass around the turbine.

Other locomotive controls and devices, not shown, may be utilized including electro-dynamic braking controls. The gasifier-turbine power plant can be utilized in other than locomotive applications such as in a stationary power plant for the production of electrical power, and the invention may be utilized in other non-generator drive applications wherein the load on the turbine can be varied.

It can be seen that the invention provides a control for a gasifier-turbine power plant that will enable operation at maximum efficiency, provides complete manual overcontrol and further provides adequate safety controls for the protection of the various components of the power plant. Other arrangements and variations of the control may be utilized, the illustrated preferred embodiment showing only one arrangement within the scope of the invention, which is not to be limited by the illustrations shown.

What is claimed is:

1. A power plant including a gasifier connected to supply a gas turbine, said turbine being mechanically independent of said gasifier, a variable load for said turbine, governor means connected to said turbine for controlling said load to maintain a predetermined turbine speed, and means connected to said governor for varying said predetermined speed in accordance with a power output condition of the gasifier without changing said power output condition.

2. A power plant including a gasifier connected to a gas turbine, a variable load for said turbine, governor means connected to said turbine and arranged to maintain said load constant to maintain a predetermined turbine speed, and means connected to said governor for varying said predetermined speed in accordance with a power output condition of the gasifier.

3. A power plant including a free piston gasifier having an air box connected to supply gases under pressure to a gas turbine, means for providing a variable load for said turbine, governor means responsive to variations in the speed of the turbine and arranged to maintain the turbine load constant to thereby maintain a predetermined turbine speed, and means connected to said governor and arranged to vary said predetermined speed in accordance with the pressure in the gasifier air box.

4. A power plant for driving a variable load, including a free piston gasifier connected to supply gas under pressure to a gas turbine connected and arranged to drive the load, said gasifier having an air intake connected to supply air to a compressor cylinder having a compressor piston connected to supply compressed air to an air box, and a power cylinder having a power piston connected to drive said compressor piston, governor means having a variable speed setting connected to said turbine for maintaining a constant load on said turbine to maintain a predetermined turbine speed, and means connected to said governor for varying the speed setting of said governor in accordance with the pressure in the gasifier air box.

5. A power plant for driving a load including a free piston gasifier connected and arranged to supply gas under pressure to a gas turbine, said turbine being connected to said load, turbine speed responsive means for controlling said load to maintain a predetermined fixed turbine speed, and means operatively connected to said speed responsive means for varying the predetermined fixed turbine speed in accordance with some power condition of said gasifier.

6. A power plant for driving a load including a free piston gasifier connected to supply gas under pressure to a gas turbine, said turbine being operatively connected to said load, means for controlling said load to maintain a predetermined fixed turbine speed, means for varying the predetermined turbine speed in accordance with a pressure in the gasifier indicative of power output of the gasifier, and means for by-passing gas from said gasifier around said turbine upon said turbine exceeding said predetermined speed by a predetermined amount.

7. A power plant for driving a load including a free piston gasifier connected to supply gas under pressure to a gas turbine, said turbine being operatively connected to said load, means responsive to variations in the speed of said turbine for varying said load to maintain a predetermined turbine speed, means for varying said predetermined speed in accordance with a pressure in said gasifier, a variable fuel control for said gasifier, first means for varying said fuel control movable between idling and full load positions, and means responsive to idle positioning of said first means for varying said fuel control in accordance with changes in the speed of said turbine to maintain a substantially constant turbine speed.

8. A power plant for driving a load including a free piston gasifier connected to supply gas under pressure to a gas turbine, said turbine being operatively connected to said load, means responsive to variations in the speed of said turbine for controlling said load to maintain a predetermined turbine speed, means for varying said predetermined speed in accordance with a pressure in said gasifier, a fuel control for said gasifier, first means for regulating said fuel control movable between idling and full load positions, and means responsive to idle operation of said first means for regulating said fuel control in accordance with changes in the speed of said turbine, said load controlling means being ineffective to control the load during idle operation of said first means.

9. In a power plant for driving a load, the combination including a free piston gasifier connected to supply gas under pressure from an exhaust to a gas turbine, said turbine being operatively connected to said load, means responsive to the speed of said turbine, a fuel control means for said gasifier, means for recirculating gases from said exhaust to the inlet of said gasifier, first means for regulating said fuel control and recirculation means at will, and a second means controlled by said turbine speed responsive means for at times regulating said fuel control and recirculation means to maintain a predetermined turbine speed.

10. The power plant of claim 9 wherein said recirculation means is movable between a maximum recirculation position and a minimum recirculation position, said first and second regulating means acting to regulate said fuel control only when the recirculation means is in its minimum recirculation position.

11. In a power plant for driving a load including a free piston gasifier connected to supply gas to a turbine, said turbine being operatively connected to said load, means responsive to the speed of said turbine, fuel control means for said gasifier, means for recirculating gas within said gasifier, said fuel control means and recirculation means being variably controlled by a common means, first means for regulating said common means at will, and second means connected to said speed responsive means for at times regulating said common means in accordance with variations in turbine speeds to maintain a predetermined fixed turbine speed by varying said gasifier fuel control and said gasifier recirculation means.

12. The power plant of claim 11 wherein means are provided for varying said load, and means operatively connecting said speed responsive means and said last mentioned means operative to vary said load to maintain a predetermined fixed turbine speed when said second means is not regulating said common means.

13. The power plant of claim 12 wherein means responsive to changes in the power output of said gasifier is connected to said speed responsive means to vary the predetermined fixed turbine speed.

14. A power plant for driving a variable load including a gas turbine having blading operatively connected to said load, a source of gases under variable pressure connected to supply said gases to said turbine, and pressure responsive means for varying said load in accordance with said variable pressure to control the speed of said turbine, whereby said gases from said supply enter said turbine blading at an angle of minimum shock loss.

15. A power plant for driving a variable load including a gas turbine having blading operatively connected to said load, a source of gas under variable pressure connected to supply said gases to said turbine, pressure responsive means for varying said load in accordance with said variable pressure to control the speed of said turbine, whereby said gases from said supply enter said turbine blading at an angle of minimum shock loss, and manual means movable between different positions for controlling said gas supply to vary the rate of flow of gases to the turbine between a minimum and maximum rate, said manual means rendering said pressure responsive means ineffective to vary the load when it is positioned for minimum flow.

16. A power plant including an electric generator having a variable field excitation, a gas turbine connected to drive the generator, a gasifier mechanically independent of said turbine and connected and arranged to supply gases under variable pressure to said turbine, a generator field excitation varying rheostat, and governor means responsive to variations of turbine speed connected to said rheostat and arranged to change said excitation in response to variations in said turbine speed and thereby change the load imposed on the turbine by said generator without affecting the operation of said gasifier.

17. A power plant including an electric generator having a variable field excitation, a gas turbine connected to drive the generator, a gasifier adapted to supply gases under variable pressure to said turbine, a field excitation varying rheostat for said generator, governor means responsive to variations of turbine speed connected to said rheostat and arranged to change said excitation in response to variations in said turbine speed, pressure responsive means connected to said governor means and to said gases under variable pressure responsive to changes in said variable pressure and arranged to cause said governor and field excitation means to maintain a turbine speed dependent on changes in said variable pressure.

18. A free piston gasifier including a variable fuel injector pump for varying the amount of fuel supplied to the gasifier and a recirculation valve for varying the amount of gas recirculated within the gasifier, a control system for the gasifier including a source of fluid under pressure, variable pressure regulator means connected to said source arranged to supply a variable pressure, a throttle control means connected to said regulator means and arranged to vary said variable pressure, pressure responsive means connected to said fuel injector pump and said recirculating valve and arranged to vary the amount of fuel supplied to the gasifier and to also vary the amount of gas recirculated within the gasifier, and means connecting said variable pressure from said pressure regulator to said pressure responsive means whereby said throttle control can vary the quantity of fuel supplied to the gasifier and the amount of gas recirculated within the gasifier.

19. A control system for a free piston gasifier including a variable fuel injector pump for varying the quantity of fuel supplied to the gasifier and a variable recirculating valve for varying the amount of recirculation of gas within the gasifier, fluid pressure responsive means connected and arranged to control said fuel pump and said recirculating valve, pressure responsive means connected to said pump and valve arranged to control the same, a source of fluid under pressure, pressure regulator means connected to said source arranged to supply a variable pressure to said pressure responsive means to control said pump and valve, first means for controlling said pressure regulator means including a manual control movable between an idle and a full load position, and second means for controlling said pressure regulator means when said manual control is in its idle position.

References Cited in the file of this patent
UNITED STATES PATENTS

| | | |
|---|---|---|
| 2,147,935 | Steiner | Feb. 21, 1939 |
| 2,200,892 | Pescara | May 14, 1940 |
| 2,355,177 | Pateras Pescara | Aug. 8, 1944 |
| 2,435,232 | Morain | Feb. 3, 1948 |
| 2,451,242 | Schlapfer | Oct. 12, 1948 |
| 2,474,033 | Chamberlin et al. | June 21, 1949 |
| 2,708,826 | Torell | May 24, 1955 |

OTHER REFERENCES

"Steam Turbine Design" (Morrow), published by Edward Arnold (London), 1911, pages 74, 75, 122 and 132.